(12) United States Patent
Stoddart et al.

(10) Patent No.: US 11,890,591 B2
(45) Date of Patent: *Feb. 6, 2024

(54) LITHIATED CYCLODEXTRIN METAL ORGANIC FRAMEWORKS AND METHODS OF MAKING AND USING THE SAME

(71) Applicants: Northwestern University, Evanston, IL (US); KING ABDULAZIZ CITY FOR SCIENCE AND TECHNOLOGY (KACST), Riyadh (SA)

(72) Inventors: James Fraser Stoddart, Evanston, IL (US); Hasmukh A. Patel, Evanston, IL (US); Zhichang Liu, Evanston, IL (US); Siva Krishna Mohan Nalluri, Chicago, IL (US)

(73) Assignees: Northwestern University, Evanston, IL (US); King Abdulaziz City for Science and Technology (KACST), Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,814

(22) Filed: Apr. 11, 2022

(65) Prior Publication Data

US 2022/0347652 A1 Nov. 3, 2022

Related U.S. Application Data

(63) Continuation of application No. 16/632,653, filed as application No. PCT/US2018/043217 on Jul. 23, 2018, now Pat. No. 11,298,677.

(Continued)

(51) Int. Cl.
*B01J 20/22* (2006.01)
*B01J 20/28* (2006.01)
(Continued)

(52) U.S. Cl.
CPC ............ *B01J 20/226* (2013.01); *B01D 53/02* (2013.01); *C08B 37/0015* (2013.01); *B01D 2253/204* (2013.01)

(58) Field of Classification Search
CPC .. B01D 53/02; B01D 53/04; B01D 2253/204; B01D 2257/102; B01D 2257/108;
(Continued)

(56) References Cited

U.S. PATENT DOCUMENTS 9,085,460 B2 * 7/2015 Stoddart ................ B01J 20/226
11,298,677 B2 * 4/2022 Stoddart ................ B01J 20/226
(Continued)

FOREIGN PATENT DOCUMENTS

WO 2011116222 A2 9/2011
WO WO 20011/16222 A2 * 9/2011

OTHER PUBLICATIONS

Al-Ghamdi, S., et al. "Synthesis of nanoporous carbohydrate metal-organic framework and encapsulation of acetaldehyde." Journal of Crystal Growth 451 (2016): 72-78.
(Continued)

*Primary Examiner* — Frank M Lawrence, Jr.
(74) *Attorney, Agent, or Firm* — Quarles & Brady LLP

(57) ABSTRACT

Disclosed herein are lithiated cyclodextrin metal organic frameworks and method of making and using the same. A metal organic framework comprising a coordinated network of repeating units extending in three dimensions, wherein the repeating unit comprises a cyclodextrin, a first coordinating metal cation, and a second coordinating metal cation.

16 Claims, 7 Drawing Sheets

Related U.S. Application Data

(60) Provisional application No. 62/535,579, filed on Jul. 21, 2017.

(51) Int. Cl.
*B01D 53/02* (2006.01)
*C08B 37/16* (2006.01)

(58) Field of Classification Search
CPC .......... B01D 2257/504; C08B 37/0015; Y02C 20/40; B01J 20/226; B01J 20/28011; B01J 20/28057
USPC ............... 95/900, 130; 96/108; 502/400–402
See application file for complete search history.

(56) References Cited

U.S. PATENT DOCUMENTS

| | | | |
|---|---|---|---|
| 2016/0061770 A1* | 3/2016 | Stoddart ............ | G01N 27/4074 205/785.5 |
| 2017/0028383 A1* | 2/2017 | Limketkai ............... | B01D 53/04 |
| 2017/0189890 A1* | 7/2017 | Holcroft ................ | B01J 20/226 |
| 2017/0274097 A1* | 9/2017 | Limketkai ............ | A61K 9/0014 |
| 2018/0189551 A1* | 7/2018 | Ranganath .............. | G06F 18/22 |
| 2021/0228577 A1* | 7/2021 | Belgsir ............... | C08B 37/0012 |

OTHER PUBLICATIONS

Bagabas, A. A., et al. "?—Cyclodextrin cuprate sandwich-type complexes." Inorganic chemistry 52.6 (2013): 2854-2861.

D'Alessandro, D. M., et al. "Carbon dioxide capture: prospects for new materials." Angewandte Chemie International Edition 49.35 (2010): 6058-6082.

Dhakshinamoorthy, A. et al. "Mixed-metal or mixed-linker metal organic frameworks as heterogeneous catalysts." Catalysis Science & Technology 6.14 (2016): 5238-5261.

Dolgopolova, E. A., et al. "Electronic properties of bimetallic metal-organic frameworks (MOFs): tailoring the density of electronic states through MOF modularity." Journal of the American Chemical Society 139.14 (2017): 5201-5209.

Forgan, R. S., et al. "Nanoporous carbohydrate metal-organic frameworks." Journal of the American Chemical Society 134.1 (2012): 406-417.

Gassensmith, J. J., et al. "Strong and reversible binding of carbon dioxide in a green metal-organic framework." Journal of the American Chemical Society 133.39 (2011): 15312-15315.

Gassensmith, J. J., et al. "A metal-organic framework-based material for electrochemical sensing of carbon dioxide." Journal of the American Chemical Society 136.23 (2014): 8277-8282.

Gassensmith, J. J., et al. "Polyporous metal-coordination frameworks." Organic letters 14.6 (2012): 1460-1463.

Han, S., et al. "Imprinting chemical and responsive micropatterns into metal-organic frameworks." Angewandte Chemie 123.1 (2011): 290-293.

Hartlieb, K. J., et al. "CD-MOF: a versatile separation medium." Journal of the American Chemical Society 138.7 (2016): 2292-2301.

Holcroft, J. M., et al. "Carbohydrate-mediated purification of petrochemicals." Journal of the American Chemical Society 137.17 (2015): 5706-5719.

Howe, J. D., et al. "Understanding structure, metal distribution, and water adsorption in mixed-metal MOF-74." The Journal of Physical Chemistry C 121.1 (2017): 627-635.

International Searching Authority, International Search Report and Written Opinion for application PCT/US2018/043217, dated Oct. 1, 2018.

Islamoglu, T., et al. "Postsynthetic tuning of metal-organic frameworks for targeted applications." Accounts of chemical research 50.4 (2017): 805-813.

Jiao, Y., et al. "Mixed-metallic MOF based electrode materials for high performance hybrid supercapacitors." Journal of Materials Chemistry A 5.3 (2017): 1094-1102.

Kim, M., et al. "Postsynthetic ligand and cation exchange in robust metal-organic frameworks." Journal of the American Chemical Society 134.43 (2012): 18082-18088.

Klet, R. C., et al. "Synthetic Access to Atomically Dispersed Metals in Metal-Organic Frameworks via a Combined Atomic-Layer-Deposition-in-MOF and Metal-Exchange Approach." Chemistry of Materials 28.4 (2016): 1213-1219.

Lalonde, M., et al. "Transmetalation: routes to metal exchange within metal-organic frameworks." Journal of Materials Chemistry A 1.18 (2013): 5453-5468.

Lau, C. H., et al. "A route to drastic increase of CO 2 uptake in Zr metal organic framework UiO-66." Chemical Communications 49.35 (2013): 3634-3636.

Liu, B., et al. "Optimized synthesis and crystalline stability of ?-cyclodextrin metal-organic frameworks for drug adsorption." International journal of pharmaceutics 514.1 (2016): 212-219.

Liu, Z., et al. "Surveying macrocyclic chemistry: from flexible crown ethers to rigid cyclophanes." Chemical Society Reviews 46.9 (2017): 2459-2478.

Liu, Z. et al. "Extended metal-carbohydrate frameworks." Pure and Applied Chemistry 86.9 (2014): 1323-1334.

Liu, Z., et al. "Selective isolation of gold facilitated by second-sphere coordination with a-cyclodextrin." Nature communications 4.1 (2013): 1-9.

Michida, W., et al. "Crystal growth of cyclodextrin-based metal-organic framework with inclusion of ferulic acid." Crystal Research and Technology 50.7 (2015): 556-559.

Patel, H. A., et al. "Noninvasive substitution of K+ sites in cyclodextrin metal-organic frameworks by Li+ ions." Journal of the American Chemical Society 139.32 (2017): 11020-11023.

Patel, H. A., et al. "Carbon dioxide capture adsorbents: chemistry and methods." ChemSusChem 10.7 (2017): 1303-1317.

Smaldone, R. A., et al. "Metal-organic frameworks from edible natural products." Angewandte Chemie International Edition 49.46 (2010): 8630-8634.

Sun, D., et al. "Introduction of a mediator for enhancing photocatalytic performance via post-synthetic metal exchange in metal-organic frameworks (MOFs)." Chemical Communications 51.11 (2015): 2056-2059.

Wu, D., et al. "Direct calorimetric measurement of enthalpy of adsorption of carbon dioxide on CD-MOF-2, a green metal-organic framework." Journal of the American Chemical Society 135.18 (2013): 6790-6793.

Xu, H., et al. "A first cyclodextrin-transition metal coordination polymer." Crystal Growth & Design 16.10 (2016): 5598-5602.

Yaghi, O. M., et al. "Reticular synthesis and the design of new materials." Nature 423.6941 (2003): 705-714.

* cited by examiner

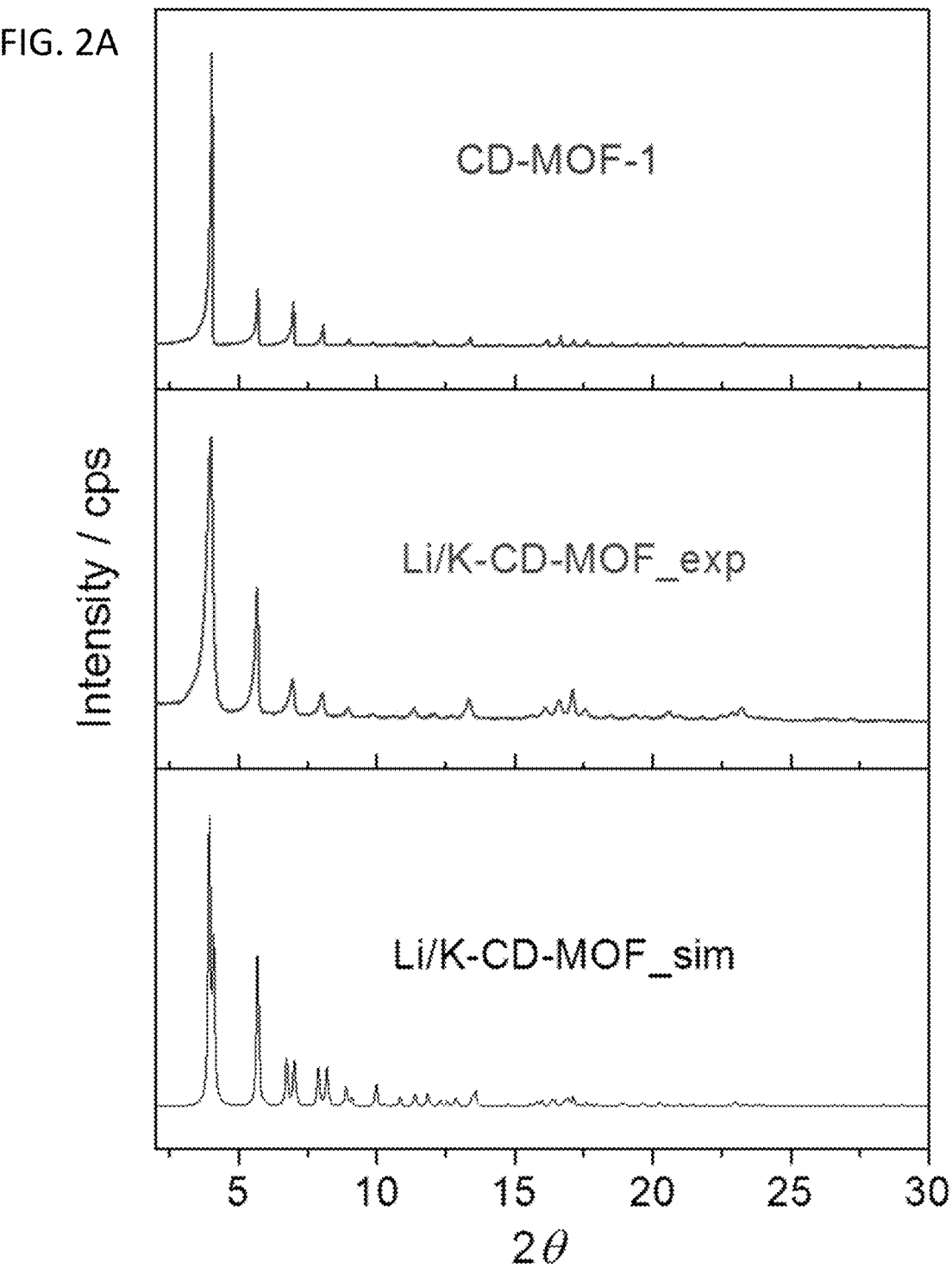

LITHIATED CYCLODEXTRIN METAL ORGANIC FRAMEWORKS AND METHODS OF MAKING AND USING THE SAME

CROSS-REFERENCE TO RELATED APPLICATIONS

The present application is a continuation of U.S. patent application Ser. No. 16/632,653, patented as U.S. Pat. No. 11,298,677 on Apr. 12, 2022, that is a national phase application of International Application Ser. No. PCT/US2018/04312, filed Jul. 23, 2018, which claims benefit of priority to U.S. Patent Application Ser. No. 62/535,579, filed Jul. 21, 2017.

FIELD OF INVENTION

The present disclosure is generally related to metal organic frameworks and methods of making and using the same. More particularly, the present disclosure is generally related to lithiated cyclodextrin metal organic frameworks and method of making and using the same.

BACKGROUND

The advent of a renewable, edible and porous framework [1]—namely, cyclodextrin-metal organic frameworks (CD-MOFs) derived from γ-cyclodextrin[2] (γ-CD) and alkali metal salts—constitutes a class of porous frameworks that can be synthesized from completely nontoxic, naturally occurring starting materials on a large scale. [3] Since the serendipitous discovery[3a] of CD-MOFs in 2010 and as a result of their ease of synthesis and the ready availability of their building blocks, they have found applications in gas sorption, [3b, 4] sensors, [5] drug delivery, [6] encapsulation of volatile compounds and fullerenes[7] in addition to hydrocarbon separations. [3e, 8]

One of the unique features of metal-organic frameworks (MOFs) is the flexibility in their design and syntheses. [9] Postsynthetic modifications of MOFs, leading to the introduction of other metals into their secondary building units (SBUs) have been achieved, [10] while retaining their porous frameworks and the structural integrities. Furthermore, the organic linkers/struts in MOFs can also be exchanged[11] through the use of ingenious postsynthetic techniques to install targeted functionalities. The incorporation of different metal ions into the frameworks of MOFs, in order to form mixed-metal organic frameworks, has become relevant in recent years in relation to attempts to explore applications in various fields, e.g., heterogeneous catalysis, [11b] charge carriers, [12] gas uptake, [10b, 13] and photocatalytic activity. [10d]Although several alkali metal salts have been employed in the generation of CD-MOFs, there are only three porous frameworks[3b, 3c]—CD-MOF-1, CD-MOF-2, and CD-MOF-3—obtained from γ-CD and the alkali metal cations $K^+$, $Rb^+$, and $Cs^+$, respectively. The challenge in preparing CD-MOFs with cations, other than these three alkali metal ions, lies in an inability to obtain crystalline highly porous frameworks. [3d, 14] It transpires that the various alkali metals salts—e.g., KOH, RbOH, CsOH, $Na_2CO_3$, $K_2CO_3$, KF, KCl, KBr, $NaBPh_4$—form[3c] cubic crystals with γ-CD, occupying the space group 1432. Among them all, only CD-MOFs-1-3, synthesized from KOH, RbOH and CsOH, respectively, have been characterized[3] by full crystal structural analyses.

SUMMARY OF THE INVENTION

Disclosed herein are cyclodextrin metal organic frameworks (CD-MOFs) and methods of making and using the same. The CD-MOFs are prepared from a co-crystalization methodology using at least two different cations. The metal organic framework comprises a coordinated network of repeating units extending in three dimensions, wherein the repeating unit comprises a cyclodextrin and a metal salt component. The metal salt component comprises a first coordinating metal cation and a second coordinating metal cation and the first coordinating metal cation and the second coordinating metal cation are different. Suitably, the cyclodextrin is γ-cyclodextrin.

The first coordinating metal cation and the second coordinating metal cation may Group I metal cations. The first coordinating metal cation is $Li^+$. The second coordinating metal cation may be $K^+$. Suitably, the metal salt component comprises both $Li^+$ and $K^+$.

The metal organic framework may have one or more of the following properties: a Brunauer-Emmett-Teller (BET) surface area of at least 600 m2 $g^{-1}$; a $CO_2$ adsorption capacity of at least 2.0 mmol $g^{-1}$ at 298 K and 1 bar; a $CO_2$ adsorption capacity of at least 3.0 mmol $g^{-1}$ at 273 K and 1 bar; a $H_2$ adsorption capacity of at least 80 cm3 $g^{-1}$ at 77 K and 1 bar; or a pore maxima centered between about 8.0 Å and about 20.0 Å. Suitably the metal organic framework has at least two of these properties. In some embodiments, the metal organic framework has all of these properties.

The metal organic framework may have any suitable molar ratio of the first coordinating metal cation to the second coordinating metal cation that allows for the preparation of a porous network. Suitably, the molar ratio of the first coordinating metal cation to the second coordinating metal cation is between about 1:99 to about 35:65. In some cases, the molar ratio of the first coordinating metal cation to the second coordinating metal cation is between about 20:85 to about 35:65.

The repeating unit may comprise twisted $(CD)_6$ repeating cubes. The first coordinating metal cation and the second coordinating metal cation may be coordinated to six of the eight α-D-glucopyranosyl residues in an alternating 1°/2° face fashion and/or the framework may also comprise spherical cavities.

The metal organic framework may be capable of adsorbing gases and the metal organic framework may further comprise an adsorbed gas. Exemplary adsorbed gasses comprise $CO_2$, $H_2$, or $N_2$.

The metal organic frameworks may be capable of forming crystalline compositions. The compositions may have a molecular packing arrangement belonging to the R 3 2 space group. In some embodiments, the metal organic framework has lattice parameters of a=43.1±1.0 Å, b=43.1±1.0 Å, c=28.0±1.0 Å, α=90°, β=90°, and γ=120°.

A method of preparing the metal organic frameworks is also provided. The method comprise providing a solution comprising a cyclodextrin, a metal salt component, and a first solvent and adding a second solvent to the solution to prepare the metal organic framework, wherein the metal salt component comprises a first coordinating metal cation and a second coordinating metal cation and wherein the cyclodextrin, the first coordinating metal cation, or the second coordinating metal cation have a lower solubility in the second solvent than the first solvent. The first and second coordinating metal cations may be any of the cations described above. The molar ratio of the first coordinating metal cation and the second coordinating metal cation to cyclodextrin maybe greater than about 8.0 and/or the molar ratio of the first coordinating metal cation to the second coordinating metal cation may be between about 15:1 to about 1:15. The cyclodextrin may be a γ-cyclodextrin.

A method of use the metal organic frameworks for the adsorption of a gas is also provide. The method comprises providing a metal organic framework and a gas to be adsorbed under conditions sufficient for the adsorption of the gas within the metal organic framework. Exemplary gasses to be adsorbed include without limitation $CO_2$, $H_2$, or $N_2$.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIG. 2A shows powder X-ray diffraction patterns for CD-MOF-1 and Li/K-CD-MOF compared with those simulated from the single-crystal structures. The similarity of the theoretical and experimental patterns indicates that the porous frameworks are stable upon substitution with $Li^+$ ions.

DETAILED DESCRIPTION OF THE INVENTION

Figure 1A:
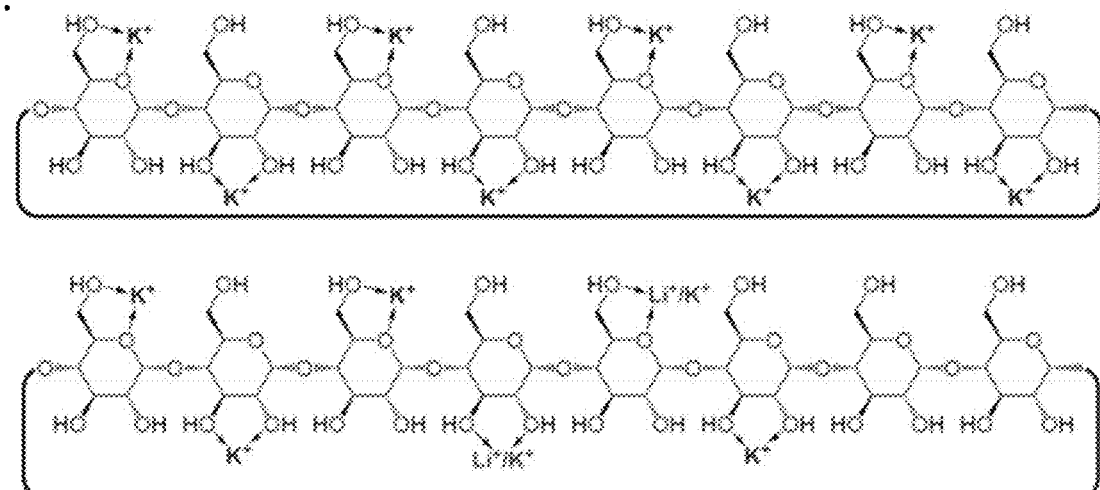
FIG. 1A shows structural formulas representing the modes of coordination of $K^+$ and $Li^+/K^+$ ions with γ-CD in CD-MOF-1 and Li/K-CD-MOF, respectively. A ball-and-stick representation of the solid-state framework of Li/K-CD-MOF where green and purple spheres represent $Li^+/K^+$ and $K^+$ ions, respectively.

Disclosed herein are cyclodextrin metal organic frameworks (CD-MOFs) and methods of making and using the same. The CD-MOFs are prepared from a co-crystalization methodology using at least two different cations. This methodology tackles the long-standing constraints of generating porous architectures from only a select few cations and allows for the preparation of new materials having high surface areas and high adsorption capacities.

Metal-organic frameworks (MOFs) are a class of hybrid materials comprising inorganic nodes and organic linkers. More specifically, the MOFs have a structure comprising inorganic (e.g., metal) nodes, also referred to as centers, coordinated via organic molecular linkers to form a highly connected porous network. The CD-MOFs are porous materials constructed from CD-based organic molecular linker coordinated by metal cation nodes. CD is composed of a circular oligomer of five or more α-D-glucopyranosyl residues

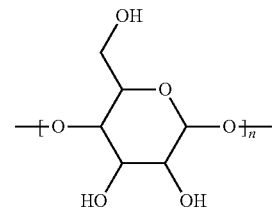

linked 1→4. Suitably, the number of residues n may be greater than or equal to 5 and less than or equal to 15. This includes α-CD, β-CD, and γ-CD, which are 6-, 7- and 8-membered rings, respectively. The constrained, circular oligomers form tori. The tori have a macrocyclic character that is composed of a central lipophilic cavity and hydrophilic outer surface. The tori also have a truncated cone or "bucket" shape having a primary (1°) face comprising the C-6 hydroxyl moieties and a secondary (2°) face comprising the C-2 and C-3 hydroxyl moieties. The CD-MOFs built from the CD tori are generally characterized by larger cavities connected be a series of smaller channel-like pores. Charge-balancing counter ions are present in the CD-MOF structures to compensate for the metal cation nodes. The charge balancing anions that are initially present in the CD-MOFs are derived from the salts used to synthesize the CD-MOFs. For example, if the CD-MOFs are crystallized from a metal hydroxide, the charge-balancing anions will be hydroxy ($OH^-$) anions.

CD-MOFs are highly water soluble, non-toxic, and can be constructed from biocompatible CD and biocompatible metals. Additionally, CD-MOFs are readily degraded. For example, γ-CD can be hydrolyzed in the presence of α-amylase, whereas α- and β-CD are digestible by intestinal microflora and other microorganisms.

As used herein "cyclodextrin" or "CD" is meant to include circular oligomers of α-D-glucopyranosyl residues and derivatives prepared by the chemical modification of the hydroxyl moieties on either or both of the primary or secondary faces. The chemical modification of the hydroxyl moieties are suitably accomplished prior to assembly of the CD-MOF or post-assembly of the CD-MOF. Accordingly, the CD-MOFs may comprise a CD compound of Formula I

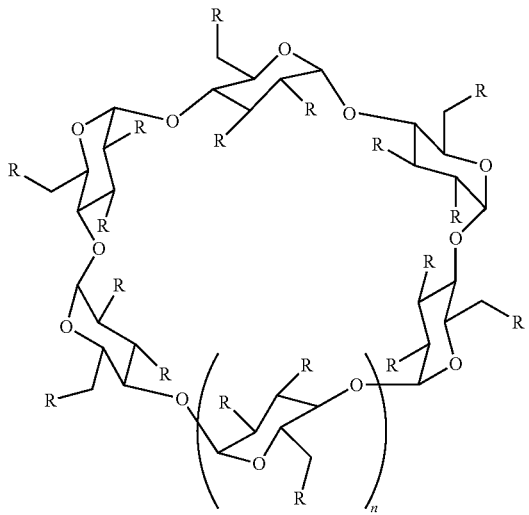

wherein n=0-10; and R is independently selected from the group consisting of —OH; —NR'R"; $C_1$-$C_{18}$ alkyl optionally substituted with one, two, three, four or five $R^1$ groups; $C_2$-$C_{18}$ alkenyl optionally substituted with one, two, three, four or five $R^1$ groups; $C_2$-$C_{18}$ alkynyl optionally substituted with one, two, three, four or five $R^1$ groups; $C_1$-$C_{18}$ alkoxy optionally substituted with one, two, three, four or five $R^1$ groups; —S(=O)$_2$R'; —S(=O)OR'; —S(=O)R'; —C(=O)OR'; —CN; —C(=O)R'; —SR'; —N=N$^+$=N$^-$; —NO$_2$, —OSO$_2$R$^1$; —C(=O)OR', —O(=S)SR', —P(=O)(OR')$_2$; —OP(=O)(OR')$_2$; —P(=O)(OR')R"; —N=R'R"; —NR'P(OR")(OR'); —OC(=O)NR'R", aryl optionally substituted with one, two, three, four or five $R^2$ groups; heteroaryl optionally substituted with one, two, three, four or five groups independently selected from $R^2$ groups; and cycloalkyl optionally substituted with one, two, three, four or five groups independently selected from $R^2$ groups; wherein each $R^1$ group is independently selected from hydroxyl, halo, lower alkoxy, —NR'R", —S(=O)$_2$R', —S(=O)OR', —S(=O)R', —C(=O)OR', —CN, —C(=O)R', —N=N$^+$=N$^-$, —SR', —NO$_2$, —OSO$_2$R', —C(=O)OR', —O(=S)SR', —P(=O)(OR')$_2$, —OP(=O)(OR')$_2$; —P(=O)(OR')R", —N=R'R", —NR'P(OR")(OR'), —OC(=O)NR'R", aryl optionally substituted with one, two, three, four or five R' groups; heteroaryl optionally substituted with one, two, three, four or five groups independently selected from R' groups; and cycloalkyl optionally substituted with one, two, three, four or five groups independently selected from R' groups; wherein each $R^2$ group is independently selected from lower alkyl, lower alkyenyl, lower alkynyl, hydroxyl, halo, lower alkoxy, —NR'R", —S(=O)$_2$R', —S(=O)OR', —S(=O)R', —C(=O)OR', —CN, —C(=O)R', —N=N$^+$=N$^-$, —SR', —NO$_2$, —OSO$_2$R1, —C(=O)OR', —O(=S)SR', —P(=O)(OR')$_2$, —OP(=O)(OR')$_2$; —P(=O)(OR')R"; —N=R'R"; —NR'P(OR")(OR'); —OC(=O)NR'R", aryl optionally substituted with one, two, three, four or five R' groups; heteroaryl optionally substituted with one, two, three, four or five groups independently selected from R' groups; and cycloalkyl optionally substituted with one, two, three, four or five groups independently selected from R' groups; and wherein each R' and R" are independently selected from the group consisting of H, lower alkyl and aryl (U.S. Patent Publication No. 2012/0070904).

α-CD, β-CD, and γ-CD in the present invention are meant as a 6-, 7- and 8-membered ring, respectively. In certain embodiments, the R group of α-CD, β-CD, or γ-CD comprises OH. In other embodiments, the R group of α-CD, β-CD, or γ-CD comprises any of the other groups described above.

"Lower alkyl" in the present invention is meant as a straight or branched chain alkyl radical having, 1-6, and preferably from 1-3, carbon atoms. Examples include but are not limited to methyl, ethyl, propyl, isopropyl, n-butyl, sec-butyl, tert-butyl, pentyl, 2-pentyl, isopentyl, neopentyl, hexyl, 2-hexyl, 3-hexyl, and 3-methylpentyl. Each alkyl group may be optionally substituted with one, two or three substituents such as, for example, a halo, cycloalkyl, aryl, alkenyl or alkoxy group and the like.

"Lower alkenyl" is meant as a straight or branched hydrocarbon radical having from 2 to 6 atoms and one or two double bonds and includes, for example, ethenyl, propenyl, 1-but-3-enyl, 1-pent-3-enyl, 1-hex-5-enyl. The alkenyl group can also be optionally mono-, di-, or trisubstituted with, for example, halo, aryl, cycloalkyl or alkoxy and the like.

"Lower alkynyl" is meant as a straight or branched hydrocarbon radical having from 2 to 6 atoms and one or two triple bonds and includes, for example, propynyl, 1-but-3-ynyl and the like. The alkynyl group can also be optionally mono-, di-, or trisubstituted with, for example, halo, aryl, cycloalkyl or alkoxy and the like.

"Lower alkoxy" is meant as an —O— lower alkyl group wherein lower alkyl is as defined above.

"Halo" or "halogen" is meant as a halogen radical of fluorine, chlorine, bromine or iodine.

"Aryl" is meant as an aromatic carbocylic radical having a single ring (e.g. phenyl), multiple rings (e.g. biphenyl) or multiple fused rings in which at least one is aromatic (e.g. 1,2,3,4-tetrahydronaphthyl).

"Heteroaryl" is meant as one or multiple fused aromatic ring systems of 5-, 6- or 7-membered rings containing at least one and up to four heteroatoms selected from nitrogen, oxygen or sulfur. Examples include but are not limited to furanyl, thienyl, pyridinyl, pyrimidinyl, benzimidazolyl and benzoxazolyl.

"Cycloalkyl" is meant as a carbocylic radical having a single ring (e.g. cyclohexyl), multiple rings (e.g. bicyclohexyl) or multiple fused rings (e.g.). In addition, the cycloalkyl group may have one or more double bonds.

The CD-MOFs comprise a metal salt component. The metal salt component comprises at least two different coordinating metal cations. The coordinating metal cations act as nodes or centers to coordinate the organic CD linkers to form highly connected porous networks. The metal cations may be suitably selected from metal cations capable of forming complexes with carbohydrates. The metal cations may be independently selected from 1+, 2+, or 3+ cations. Suitably, at least two of the different metal cations may each have the same oxidation state but they need not be. The metal cations may be independently selected from Group I (Alkali) metal cations, Group II (Alkaline earth) metal cations, transition metal cations, lanthanoid metal cations, or post-transitional metal cations. Suitably, at least two of the different metal cations are each Group I, Group II, transition, post-transitional metal cations. Examples of metal cations include, without limitation, $Li^+$, $Na^+$, $K^+$, $Rb^+$, $Cs^+$, $Mg^{2+}$, $Ca^{2+}$, $Sr^{2+}$, $Ba^{2+}$, $Ag^+$, $Cd^{2+}$, $La^{3+}$, $Yb^{2+}$, $Sn^{2+}$, $Pb^{2+}$. In some embodiments, the at least one of the metal cations is selected from Group I transition metals, suitably $Li^+$, $Na^+$, $K^+$, $Rb^+$, or $Cs^+$. In other embodiments, at least two of the metal cations are selected from Group I transition metals, suitably a combination of $Li^+$, $Na^+$, $K^+$, $Rb^+$, or $Cs^+$. Examples include, without limitation, $Li^+$ and $Na^+$, $Li^+$ and $K^+$, $Li^+$ and $Rb^+$, $Li^+$ and $Cs^+$, $Na^+$ and $K^+$, $Na^+$ and $Rb^+$, $Na^+$ and $Cs^+$, $K^+$ and $Rb^+$, $K^+$ and $Cs^+$, or $Rb^+$ and $Cs^+$.

The molar ratio of the first coordinating metal cation to the second coordinating metal cation in the CD-MOF may be any molar ratio that allows for the formation of a highly connected porous network of organic CD linkers coordinated with the first and second coordinated metal cations. The ratio of the first and second coordinate metal cation may be varied between about 1:99 and about 99:1, about 20:80 and about 80:20, or about 35:65 and about 65:35. In some embodiments, the ratio of the first and second coordinate metal cation may be varied between about 1:99 and about 35:65 or about 20:80 and 35:65.

Suitably, the porous network comprises interconnected pores and channels having a high surface area. Suitably, the CD-MOF has a Brunauer-Emmett-Teller (BET) surface area of at least 600 $m^2$ $g^{-1}$, at least 800 $m^2$ $g^{-1}$, at least 1000 $m^2$ $g^{-1}$, or at least 1200 $m^2$ $g^{-1}$. In some embodiments, the BET surface area is between about 800 $m^2$ $g^{-1}$ and about 1500 $m^2$ $g^{-1}$, about 1000 $m^2$ $g^{-1}$ and about 1400 $m^2$ $g^{-1}$, or about 1200 $m^2$ $g^{-1}$ and about 1300 $m^2$ $g^1$. Suitably the CD-MOF has a pore maxima centered between about 8.0 Å and about 20.0 Å, or about 10.0 Å and about 18.0 Å, or about 11.0 Å and about 13.0 Å. In some embodiments, the pore may be a spherical cavity prepared from a repeating unit of $(CD)_6$ cubes. Suitably the CD-MOF has a $CO_2$ adsorption capacity of at least 2.0 mmol $g^{-1}$, 2.5 mmol $g^{-1}$, or 3.0 mmol $g^{-1}$ at 298 K and 1 bar and/or a $CO_2$ adsorption capacity of at least 3.0 mmol $g^{-1}$, 3.5 mmol $g^{-1}$, 4.0 mmol $g^{-1}$, or 4.0 mmol $g^{-1}$ at 273 K and 1 bar. In some embodiments, the CD-MOF has a $CO_2$ adsorption capacity between about 2.0 mmol $g^{-1}$ and about 5.0 mmol $g^{-1}$, about 2.5 mmol $g^{-1}$ and about 4.5 mmol $g^{-1}$, or about 3.0 mmol $g^{-1}$ and about 4.0 mmol $g^{-1}$ at 298 K and 1 bar and/or a $CO_2$ adsorption capacity between about 3.0 mmol $g^{-1}$ and about 6.0 mmol $g^{-1}$, about 3.5 mmol $g^{-1}$ and about 5.5 mmol $g^{-1}$, or about 4.0 mmol $g^{-1}$ and about 5.0 mmol $g^{-1}$ at 273 K. Suitably the CD-MOF has a $H_2$ adsorption capacity of at least 80 $cm^3$ $g^{-1}$, 100 $cm^3$ $g^{-1}$, or 80 $cm^3$ $g^{-1}$ at 77 K and 1 bar. In some embodiments, the CD-MOF has a $H_2$ adsorption capacity between about 80 $cm^3$ $g^{-1}$ and about 180 $cm^3$ $g^{-1}$, about 100 $cm^3$ $g^{-1}$ and about 160 $cm^3$ $g^{-1}$, or about 120 $cm^3$ $g^{-1}$ and about 140 $cm^3$ $g^{-1}$ at 77K and 1 bar.

Crystalline compositions may be prepared from CD-MOFs described herein. The crystalline composition may have a packing arrangement categorized by a trigonal crystal system. Suitably, the crystalline composition may have a R 3 2 space group. Lattice parameters or unit cell parameters may be about a=43.1±1.0 Å, b=43.1±1.0 Å, c=28.0±1.0 Å, $\alpha=90°$, $\beta=90°$, and $\gamma=120°$. In some embodiments, lattice parameters are about a=43.1±0.5 Å, b=43.1±0.5 Å, c=28.0±0.5 Å, $\alpha=90°$, $\beta=90°$, and $\gamma=120°$ or a=43.1±0.1 Å, b=43.1±0.1 Å, c=28.0±0.1 Å, $\alpha=90°$, $\beta=90°$, and $\gamma=120°$.

Generally, CD-MOFs are prepared by dissolution of both the cyclodextrin component and the metal salt component in any solvent in which both have solubility. Isolation of CD-MOFs is done by addition of a second solvent in which either of the components has poor solubility, including, but not limited to, $C_1$-$C_{18}$ alcohols, acetone, tetrahydrofuran, dioxane, acetonitrile, as well as other common organic solvents miscible with water, or any mixtures thereof. As such, in a specific non-limiting embodiment of the invention, methanol is allowed to vapor diffuse into an aqueous solution containing γCD, KOH, and LiOH in various molar ratios described in Table 1.

The metal salt component to be dissolved into solution with the cyclodextrin may comprises two or more metal salts. The first of the salts comprises the first coordinating metal cation and the second of the salts comprises the second coordinating metal cation. The salts may be added in any appropriate molar or equivalent ratio that allows for the formation of the CD-MOF. Suitably, the first salt and second salt may be provided in a molar ratio to the cyclodextrin component of at least 6.0:1.0. In some embodiments, the first salt and second salt may be provided in a molar ratio to the cyclodextrin component of at least 7.0:1.0, at least 8.0:1.0, or at least 9.0:1.0. The molar ratio of the first salt and second salt may be provided to allow for the formation of the CD-MOF with the desired ratio of the first coordinating metal cation and the second coordinating metal cation into the MOF. Suitably, the molar ratio of the first salt to the second salt may be about 15.0:1.0 to about 1.0:15.0. In some embodiments, the molar ratio of the first salt to the second salt may be about 7.0:1.0, about 3.0:1.0, about 5.0:3.0, about 1.0:1.0, or any interval therebetween.

The metal salt component also comprises a counter anion. The anion may be suitably selected from inorganic and organic anions. Exemplary inorganic anions include, without limitation, chloride, fluoride, hydroxide, sulfide, sulfinate, carbonate, chromanate, cyanide, and the like. Exemplary, organic anions include, without limitation, benzoate, azobenzene-4,4'-dicarboxylate, acetate, oxalate, and the like. The metal salt component may comprise one or more anions depending on the choice of salts selected for dissolution. For example, the metal salt component may comprise hydroxide anions from the dissolution of LiOH and KOH salts as demonstrated in the Examples, but the metal salt component may also comprise two different anions such as hydroxide and chloride from the dissolution of LiOH and KCl salts. The CD-MOF may comprise an associated counter anion before or after the CD-MOF is isolated from preparation.

As demonstrated in the Examples that follow, co-crystallization of $K^+$ and $Li^+$ ions with γ-cyclodextrin (γ-CD) has been shown to substitute the $K^+$ ion sites partially by $Li^+$ ions, while retaining the structural integrity and accessible porosity of CD-MOF-1. A series of experiments, resulting from varying the $K^+$/$Li^+$ ratio with respect to that of γ-CD, have been conducted in order to achieve the highest possible proportion of $Li^+$ ions in the framework. Attempts to obtain a CD-MOF containing only $Li^+$ ions resulted in non-porous materials. The structural occupancy on the part of the $Li^+$ ions in the new CD-MOF has been confirmed by single crystal X-ray analysis by determining the vacancies of $K^+$ sites and accounting for the cation/γ-CD ratio in CD-MOF-1. The proportion of $Li^+$ ions has also been confirmed by elemental analysis, while powder X-ray diffraction has established the stability of the extended framework. This noninvasive synthetic provides a new approach to generating mixed-metal CD-MOFs for obtaining porous framework unattainable de novo. Furthermore, the $CO_2$ and $H_2$ capture capacities of the $Li^+$-substituted CD-MOF have been shown to exceed the highest sorption capacities reported so far for CD-MOFs.

Herein, we demonstrate a synthetic methodology which overcomes the limitation of preparing porous CD-MOFs with $Li^+$ ions by co-crystallizing a metal salt component comprises two different alkali metal salts, KOH and LiOH, with γ-CD. This follows all of our failed attempts to crystallize γ-CD with LiOH alone to afford the prototypical porous structure of a CD-MOF. In the light of this failure, we turned our attention to the development of a methodology that relies on the co-crystallization of LiOH and KOH with γ-CD to produce partially Li$^+$ ion-substituted CD-MOF (referred to as "Li/K-CD-MOF") by replacing some of the K$^+$ sites in CD-MOF-1 with Li$^+$ ions.

The synthetic protocol for CD-MOF-1, i.e., CD-MOF-1 is synthesized by MeOH vapor diffusion into an aqueous solution of 8.0 equiv of KOH and 1.0 equiv of γ-CD during 7 days to afford a crop of colorless, cubic, single crystals in about 60% yield was adopted. [3a-3c] Li/K-CD-MOF was prepared by combining 8.0 equiv of KOH and LiOH, with molar ratios of LiOH/KOH varied from $Li_{0.2}$:$K_{1.4}$ to $Li_{1.4}$:$K_{0.2}$, and 1.0 equiv of γ-CD in aqueous solution. Table 1. Vapor diffusion of MeOH into these solutions during 15 days resulted in cubic, colorless single crystals, suitable for X-ray crystallography, in 43-50% yield.

The proportions of Li$^+$ ions occupying K$^+$ sites in Li/K-CD-MOFs were confirmed by Inductively Coupled Plasma Optical Emission Spectroscopy (ICP-OES). The Li/K-CD-MOF crystals were washed well with MeOH in order to remove any unreacted LiOH from the crystals before ICP-OES analysis. Li/K-CD-MOFs were digested in 5% aqueous $HNO_3$ solution. ICP-OES analyses confirmed that the proportions of Li$^+$ ions in the mixed-metal CD-MOF increased on upping the amounts of LiOH employed in the co-crystallization of Li/K-CD-MOFs. Table 2. The highest K$^+$/Li$^+$ ratio, namely, $K_{1.18}Li_{0.61}$, we were able to obtain in Li/K-CD-MOFs was achieved from the co-crystallization of LiOH and KOH in a ratio of 1.4:0.2 with respect to 1 mol equiv γ-CD.

Figure 1B:
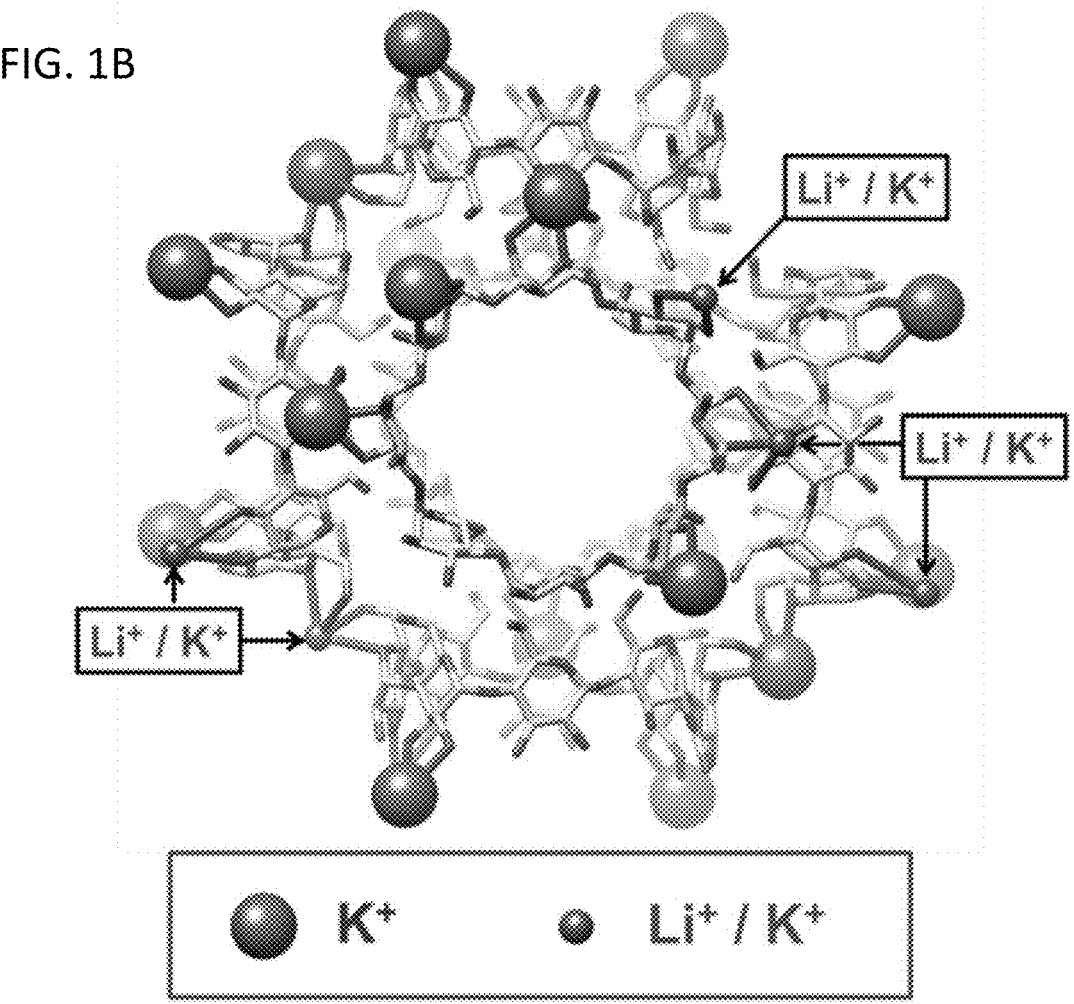
FIG. 1B shows twisted (γ-CD)$_6$ cubes in which $K^+$ and $Li^+$ ions are coordinated to the primary OH groups and the α-D-glucopyranosyl ring O atoms on alternating α-D-glucopyranosyl residues associated with the inwardly directed primary faces of the γ-CD tori, forming a spherical cavity of diameter ~1.7 nm.
Figure 1C:
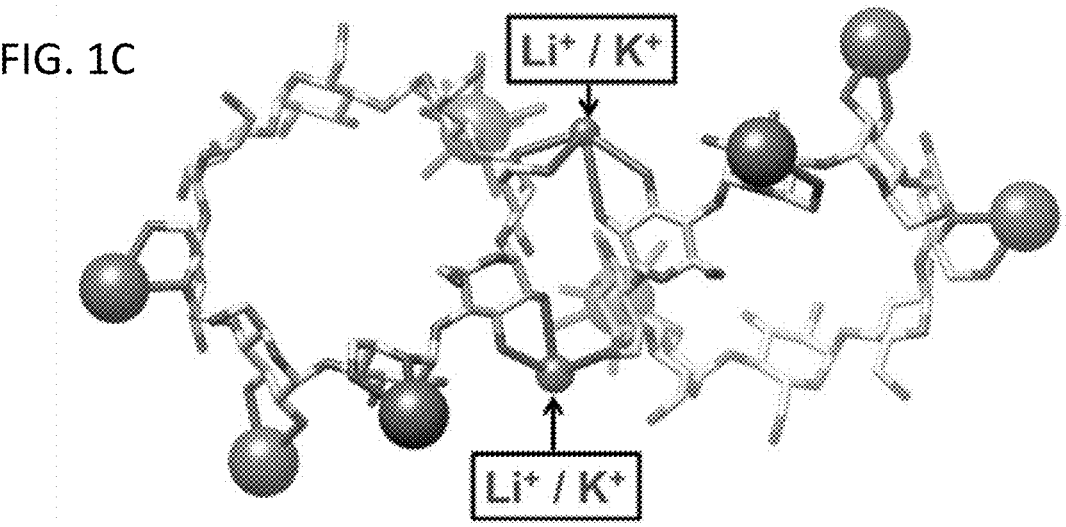
FIG. 1C shows two adjacent $K^+$ binding sites on contiguous γ-CD tori are partially occupied by $Li^+$ ions.
Figure 1D:
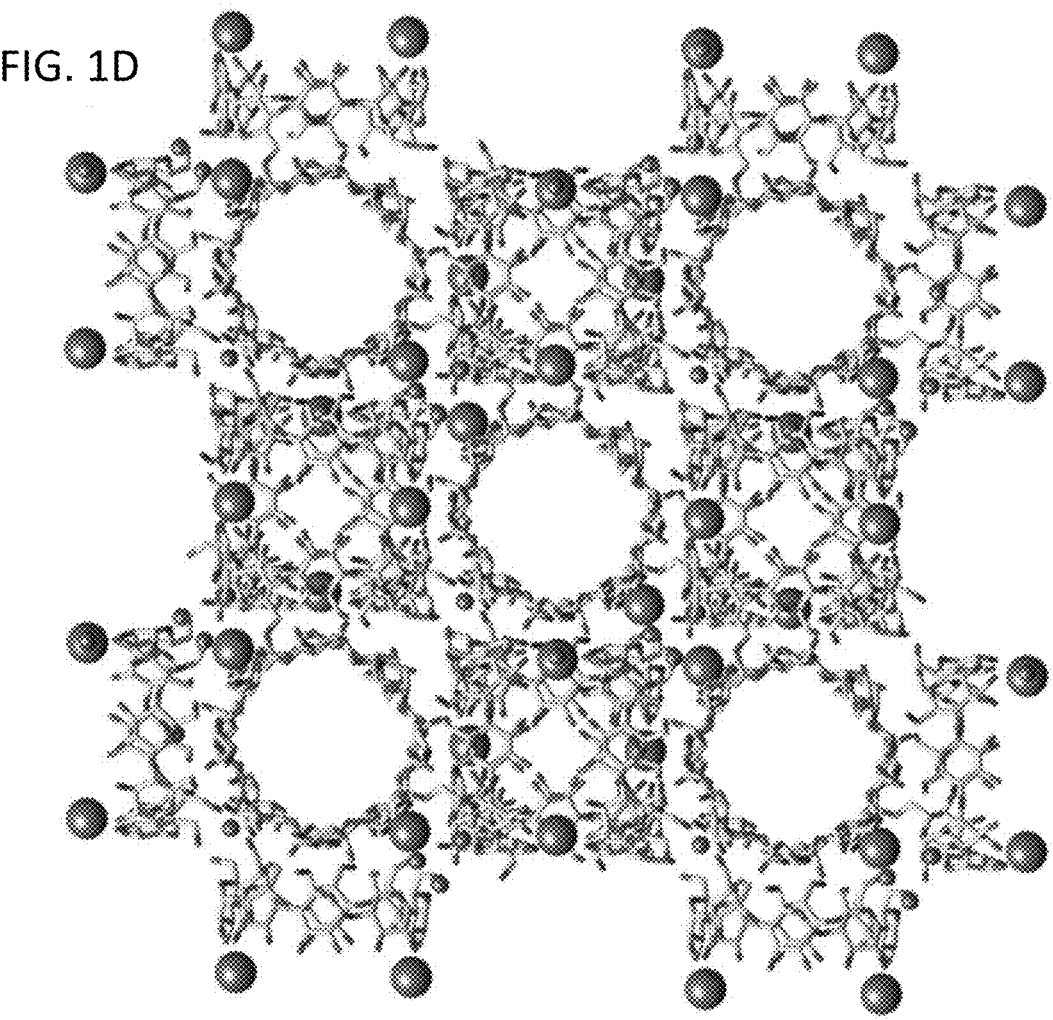
FIG. 1D shows the distorted (γ-CD)$_6$ cubes pack in an infinite pseudo-body-centered cubic manner through coordination of $K^+$ and $Li^+$ ions to the secondary OH groups of the alternating set of α-D-glucopyranosyl residues on the outwardly oriented secondary faces of the γ-CD tori.

Single crystal X-ray analysis was performed on the sample of Li/K-CD-MOF containing the highest proportion of Li$^+$ ions as indicated by ICP-OES. In contrast to CD-MOF-1, which is composed[3a] of γ-CD tori held together by K$^+$ ions in a cubic unit cell of space group 1432, the solid-state structure (FIGS. 1A-1D) of this Li/K-CD-MOF occupies the trigonal space group, R32 (γ=120°). Table 3. In comparison with CD-MOF-1,[3a] two adjacent binding sites for K$^+$ ions on γ-CD tori are partially occupied (FIGS. 1A, 1C) by Li$^+$ ions with occupancies of 0.47 and 0.53, respectively. The K$^+$ and Li$^+$ ions are coordinated to six of the eight α-D-glucopyranosyl residues in an alternating 1°/2° face fashion. Although the unit cell of Li/K-CD-MOF is different from that of the CD-MOF-1, we were still able to observe (FIG. 1B) the slightly twisted (γ-CD)$_6$ repeating cubes with spherical cavities of diameter ~1.7 nm which are assembled from six γ-CD tori through coordination with both K$^+$ and Li$^+$ ions to the C-6 OH groups and the glycosidic ring O atoms on the inwardly directed primary (1°) faces of alternating α-D-glucopyranosyl residues around the γ-CD tori. The ratio of K$^+$ and Li$^+$ ions to γ-CD was found to be 2 ($K_{1.23}Li_{0.77}$):1 which is very similar to the results obtained from ICP-OES analysis, $K_{1.18}Li_{0.61}$. The absence of coordination of K$^+$ and Li$^+$ ions on two neighboring α-D-glucopyranosyl residues of each γ-CD tori results in the distortion of a regular (γ-CD)$_6$ cube. The distorted (γ-CD)$_6$ cubes pack in an infinite pseudo-body-centered cubic manner (FIG. 1D) through the coordination of K$^+$ and Li$^+$ ions to the C-2 and C-3 OH groups of the second set of alternating α-D-glucopyranosyl residues on the outwardly oriented secondary (2°) faces of the γ-CD tori.

K$^+$ sites substitution by Li$^+$ ions were located based on the absence of K$^+$ ions in the framework. Since K$^+$ ions are the heaviest atoms in the structure, the electron density and proportion of K$^+$ ions can be determined with accuracy. The site occupancy of the K$^+$ ions in the crystal structure was refined and the missing K$^+$ ions were substituted with Li$^+$ ions. This type of substitution is possible because (i) the chemistry and coordination sphere of the two alkali metal ions is similar, although the bond distances are different[15], and so it is expected that the Li$^+$ ions will share the same site as the K$^+$ ions, and (ii) each of the alkali metal ion sites is fully occupied, meaning that there cannot be vacancies on the alkali ion sites. Full occupancy is assumed on the account of the cation/γ-CD ratio in CD-MOF-1, where the proportion of cations must balance the γ-CD. Therefore the occupancies of K$^+$ and Li$^+$ ions are complementary, and (iii) any disorder in the γ-CD molecules does not affect the overall proportion of the alkali ions since the number of γ-CD molecules is fixed.

Figure 2B:
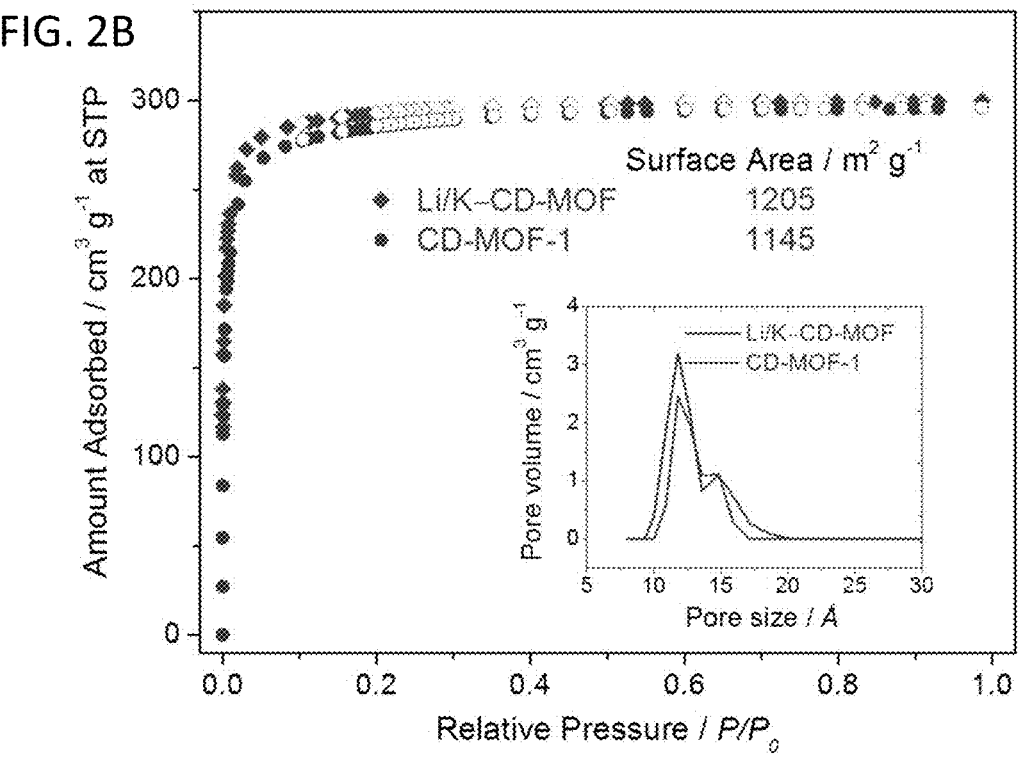
FIG. 2B shows $N_2$ adsorption isotherms for CD-MOF-1 and Li/K-CD-MOF at 77 K. Filled and open symbols represent adsorption and desorption isotherms, respectively. Inset: Pore size distribution patterns for CD-MOF-1 and Li/K-CD-MOF, calculated by the NLDFT method.
Figure 4:
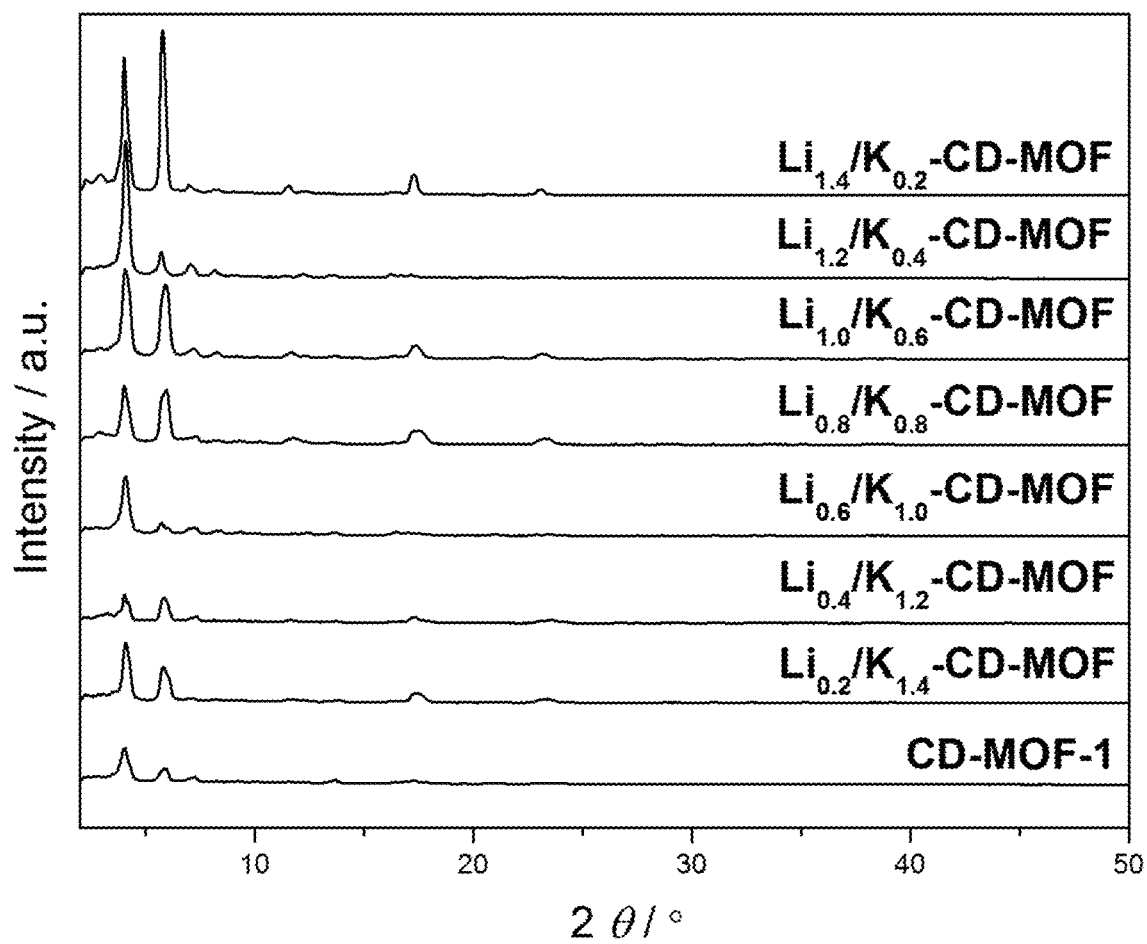
FIG. 4 shows powder X-Ray diffraction (PXRD) analyses of CD-MOF-1 and Li/K-CD-MOF with varied proportion of $Li^+$ ions. The similarity of XRD patterns indicates that the porous frameworks are stable upon substitution of $K^+$ ion sites by $Li^+$ ions in CD-MOF-1.

Powder X-ray diffraction (PXRD) experiments performed on CD-MOF-1 and Li/K-CD-MOF confirm (FIG. 2A) that their extended structures remain intact upon the substitution of some K$^+$ sites by Li$^+$ ions. The XRD patterns for CD-MOF-1 and Li/K-CD-MOF can also be compared with the simulated pattern obtained from the single crystal analysis. The comparison demonstrates that the crystallographic properties remain intact upon substitution of K$^+$ sites of CD-MOF-1 by Li$^+$ ion in Li/K-CD-MOF. Furthermore, we have not noted any changes in the PXRD patterns of Li/K-CD-MOFs when the proportions of Li$^+$ ions to K$^+$ ions are varied. FIG. 4.

Figure 3:
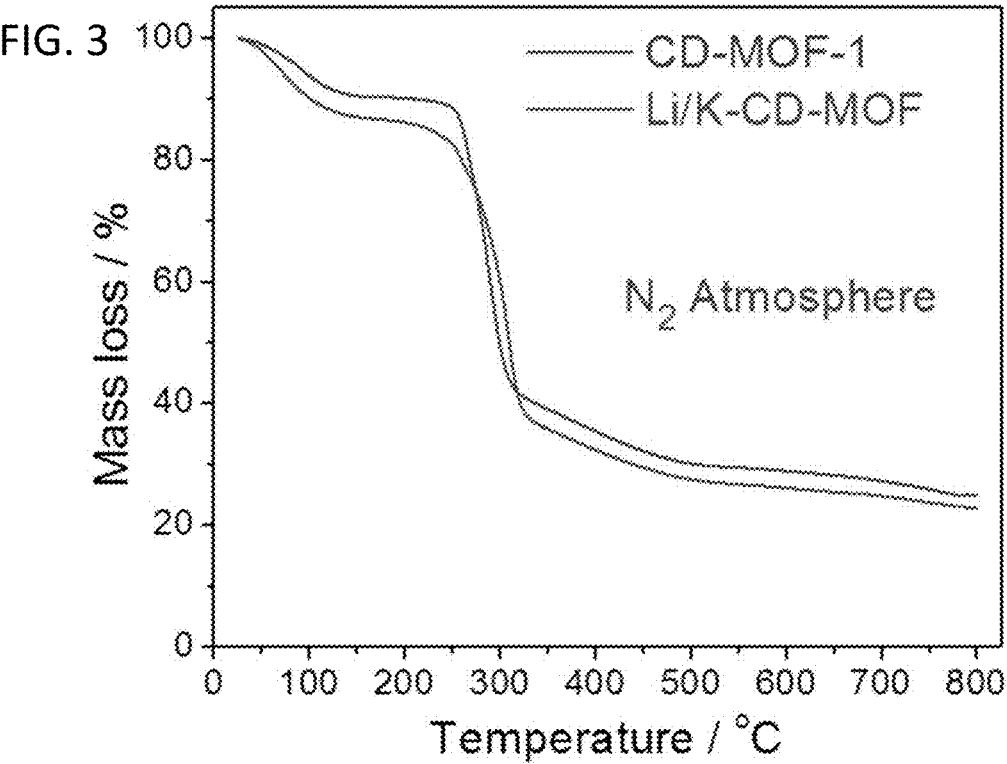
FIG. 3 shows thermogravimetric analyses for CD-MOF-1 and Li/K-CD-MOF. The initial mass loss can be attributed to the removal of solvent and the degradation of γ-CD which comes into play above 200° C.

The permanent porosities of CD-MOF-1 and Li/K-CD-MOF were examined (FIG. 2B) by $N_2$ adsorption-desorption isotherms at 77 K. Characteristic Type I isotherms, which are observed for CD-MOF-1 and Li/K-CD-MOF, confirm the presence of highly microporous materials. The Brunauer-Emmett-Teller (BET) surface areas of CD-MOF-1 and Li/K-CD-MOF were calculated to be 1145 and 1205 m$^2$ g$^{-1}$, respectively. Although some of the K$^+$ sites in CD-MOF-1 are replaced by Li$^+$ ions during co-crystallization, we detected no more than a 5% difference in the BET surface area. The pore size distribution, which was calculated using non-linear density functional theory (NLDFT), shows identical pore maxima centered on 11.7 Å, confirming (FIG. 2B, Inset) the preservation of the pore size distribution after occupation of the K$^+$ sites by Li$^+$ ions. Thermogravimetric analysis was also conducted (FIG. 3) in order to investigate the thermal stabilities of CD-MOF-1 and Li/K-CD-MOF under $N_2$. The initial mass loss up to 100° C. in both samples can be attributed to the evolution of trapped MeOH from their porous extended frameworks. CD-MOF-1 and Li/K-CD-MOF were found to be thermally stable up to 200° C. in an inert atmosphere. In both samples, further mass loss can be attributed to the degradation of the γ-CD units which comes into play above 200° C.

Figure 5A:
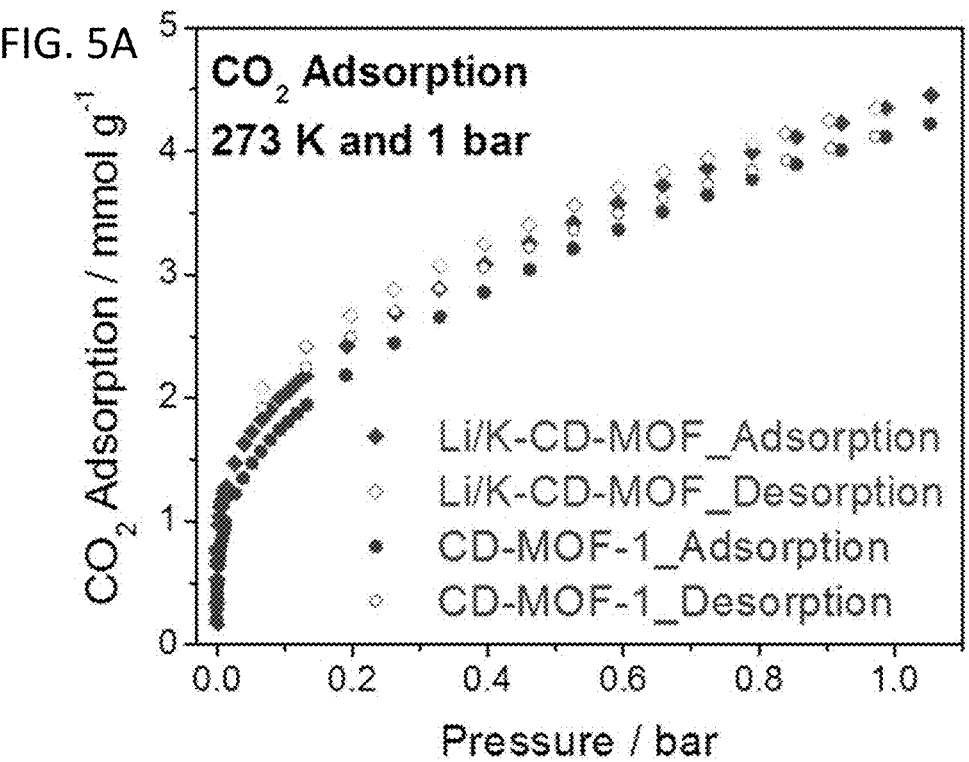
FIGS. 5A and 5B shows $CO_2$ adsorption/desorption isotherms for CD-MOF-1 and Li/K-CD-MOF at 273 K (FIG. 5A) and 298 K up to 1 bar (FIG. 5B). Filled and open symbols represent adsorption and desorption branches, respectively. The $CO_2$ sorption capacity[1a, 4] for CD-MOF-1 and Li/K-CD-MOF is higher than CD-MOF-2.
Figure 5B:
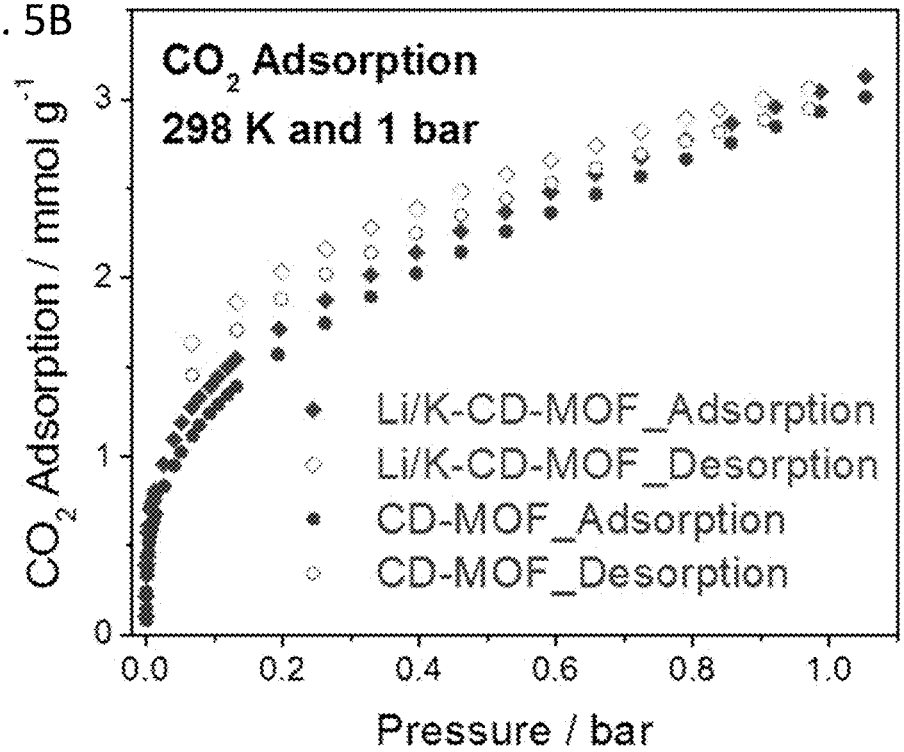

The use of the accessible porosity of Li/K-CD-MOF for gas sorption analyses has also been investigated by studying the $CO_2$ and $H_2$ gas adsorption isotherms and comparing them with those for CD-MOF-1. These experiments exhibit the integrity of the structural porosity associated with the partially Li$^+$ ion-substituted Li/K-CD-MOF. The $CO_2$ adsorption-desorption isotherms for CD-MOF-1 and Li/K-CD-MOF were carried out at 273 (FIG. 5A) and 298 K (FIG. 5B). The addition of nucleophilic reagents, e.g., primary amines, in porous materials improves[16] $CO_2$ capture by forming carbamates or bicarbonates. Likewise, the primary (1°) hydroxyl groups are also known to be more reactive than their secondary (2°) counterparts and these contribute to the reversible carbonic acid formation.[3b, 17] CD-MOF-1 and Li/K-CD-MOF show the $CO_2$ adsorption capacities of 4.2 and 4.5 mmol g$^{-1}$ at 273 K, and 3.0 and 3.1 mmol g$^{-1}$ at 298 K, respectively. A slight increase in the CO$_2$ adsorption capacity may correspond to the lower density of Li$^+$ ions compared with K$^+$ ions. Indeed, the CO$_2$ uptake capacity of Li/K-CD-MOF and CD-MOF-1 is higher than that of CD-MOF-2, namely, 1.7 and 1.4 mmol g$^{-1}$, respectively, at 273 and 298 K.[3a-3c] It is noteworthy that the most of the CO$_2$ sorption capacity was observed at low partial pressures, below 0.15 bar, in the case of both samples.

Figure 6:
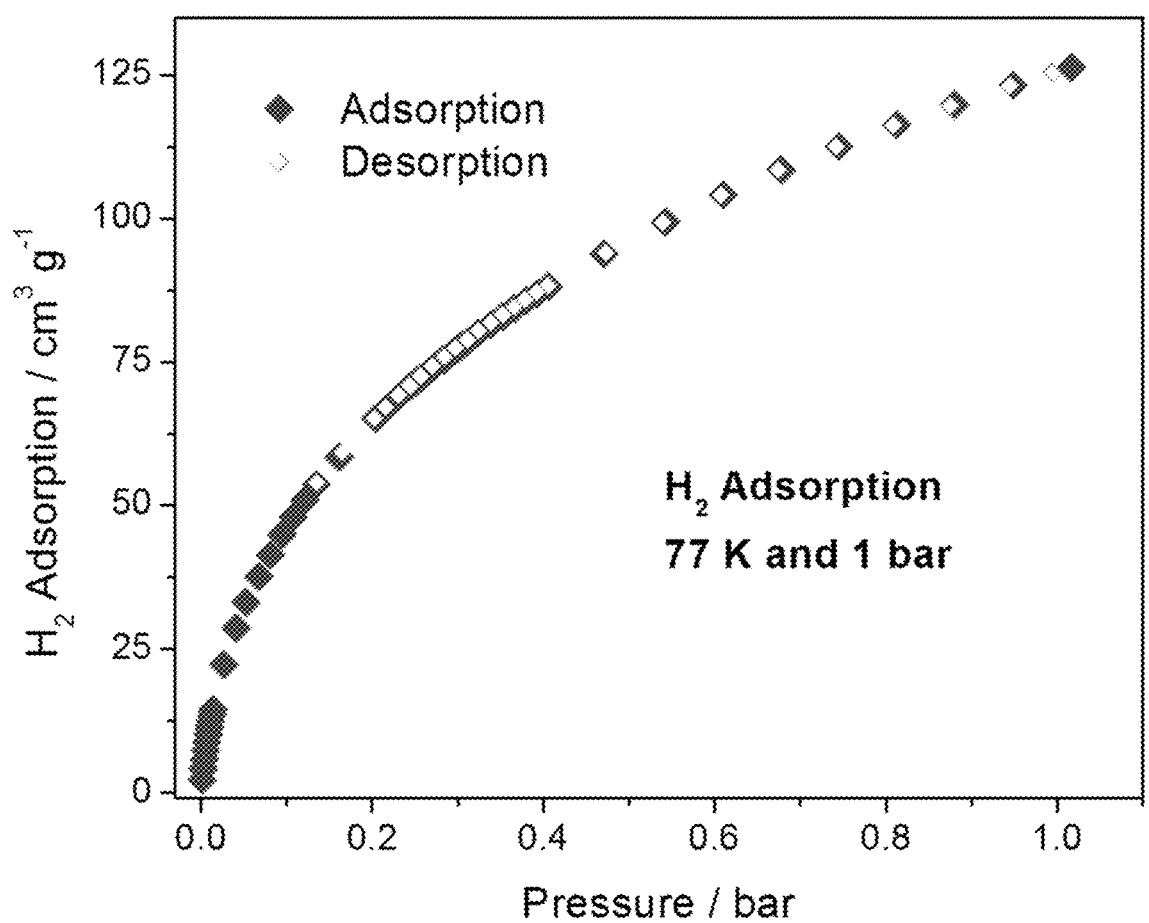
FIG. 6 shows $H_2$ Adsorption/desorption isotherms for Li/K-CD-MOF at 77 K and up to 1 bar. Filled and open symbols represent adsorption and desorption branches, respectively. $H_2$ Adsorption capacity (126 cm$^3$/g) of Li/K-CD-MOF surpassed the $H_2$ adsorption (100 cm$^3$/g)[1a] for CD-MOF-2.

The initial steep rise, which is observed at very low CO$_2$ pressures, regardless of the temperature, [16] is believed to be the result of a chemisorption process. H$_2$ sorption isotherms of Li/K-CD-MOF were also carried out at 77 K up to 1 bar. FIG. 6. Porous materials containing Li$^+$ ions are excellent when it comes to H$_2$ storage, [18] owing to the low density of Li$^+$ ions and open metal sites. Li/K-CD-MOF shows an H$_2$ adsorption capacity of 126 cm$^3$ g$^{-1}$ at 77 K and 1 bar, which surpasses the H$_2$ adsorption capacity[3c] of 100 cm$^3$ g$^{-1}$ for CD-MOF-2. We believe that the higher H$_2$ uptake capacity in Li/K-CD-MOF originates from the lower density of Li$^+$ ions compared with K$^+$ ions.

In summary, we have tackled the long-standing constraints of generating CD-MOFs, from other than K$^+$, Rb$^+$ and Cs$^+$ ions, by preparing extended frameworks containing two different cations ions. The Li$^+$ ions incorporated into the K$^+$ sites of CD-MOF-1 can be accomplished by co-crystallization of Li$^+$ and K$^+$ ions with γ-CD without sacrificing the porous architecture of the CD-MOFs. The partial substitution of K$^+$ sites by Li$^+$ ions in the frameworks has been established by determining the vacancies associated with the K$^+$ sites. Some of the K$^+$ sites are occupied by Li$^+$ ions, which share the same coordination geometry as K$^+$ ions. The Li/K-CD-MOF with the highest Li$^+$/K$^+$ ratio is stable upon removal of solvent and has revealed surface areas of approximately 1205 m$^2$ g$^{-1}$ which is slightly higher than that of CD-MOF-1. Moreover, the CO$_2$ capture capacity is not hindered by the occupying Li$^+$ ions and show CO$_2$ uptakes of 4.5 and 3.1 mmol g$^{-1}$ at 273 and 298 K, respectively. This findings show that our inability of synthesize CD-MOFs with alkali metal ions other than K$^+$, Rb$^+$ and Cs$^+$ can be addressed by employing a co-crystallization methodology.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCES (1) Liu, Z.; Stoddart, J. F. *Pure Appl. Chem.* 2014, 86, 1323-1334.

(2) Liu, Z. et al. *Chem. Soc. Rev.* 2017, 46, 2459-2478.

(3) (a) Smaldone, R. A. et al. *Angew. Chem. Int. Ed.* 2010, 49, 8630-8634. (b) Gassensmith, J. J. et al. *J. Am. Chem. Soc.* 2011, 133, 15312-15315. (c) Forgan, R. S. et al. *J. Am. Chem. Soc.* 2012, 134, 406-417. (d) Gassensmith, J. J. et al. *Org. Lett.* 2012, 14, 1460-1463. (e) Hartlieb, K. J. et al. *J. Am. Chem. Soc.* 2016, 138, 2292-2301.

(4) Wu, D.; Gassensmith, J. J. et al. *J. Am. Chem. Soc.* 2013, 135, 6790-6793.

(5) (a) Han, S. B et al. *Angew. Chem. Int. Ed.* 2011, 50, 276-279. (b) Gassensmith, J. J. et al. *J. Am. Chem. Soc.* 2014, 136, 8277-8282.

(6) (a) Xu, H. et al. *Cryst. Growth Des.* 2016, 16, 5598-5602. (b) Liu, B. T. et al. *Int. J. Pharm.* 2016, 514, 212-219.

(7) (a) Michida, W. et al. *Cryst. Res. Technol.* 2015, 50, 556-559. (b) Al-Ghamdi, S. et al. *J. Cryst. Growth* 2016, 451, 72-78. (c) Li, H. Q. et al. *Chem. Commun.* 2016, 52, 5973-5976.

(8) Holcroft, J. M. et al. *J. Am. Chem. Soc.* 2015, 137, 5706-5719.

(9) (a) Yaghi, O. M. et al, J. *Nature* 2003, 423, 705. (b) Kitagawa, S. et al. *Angew. Chem. Int. Ed.* 2004, 43, 2334-2375. (c) D'Alessandro, D. M. et al. *Angew. Chem. Int. Ed.* 2010, 49, 6058-6082.

(10) (a) Kim, M. et al. *J. Am. Chem. Soc.* 2012, 134, 18082-18088. (b) Lau, C. H. et al. *Chem. Commun.* 2013, 49, 3634-3636. (c) Lalonde, M. et al. *J. Mater. Chem. A* 2013, 1, 5453-5468. (d) Sun, D. R. et al. *Chem. Commun.* 2015, 51, 2056-2059. (e) Tu, B. B. et al. *J. Am. Chem. Soc.* 2015, 137, 13456-13459. (f) Klet, R. C. et al. *Chem. Mater.* 2016, 28, 1213-1219.

(11) (a) Fei, H. H. et al. *Inorg. Chem.* 2013, 52, 4011-4016. (b) Dhakshinamoorthy, A. et al. *Catal. Sci. Technol.* 2016, 6, 5238-5261. (c) Islamoglu, T et al. *Acc. Chem. Res.* 2017, 50, 805-813.

(12) (a) Dolgopolova, E. A. et al. *J. Am. Chem. Soc.* 2017, 139, 5201-5209. (b) Jiao, Y. et al. *J. Mater. Chem. A* 2017, 5, 1094-1102.

(13) Howe, J. D. et al. *J. Phys. Chem. C* 2017, 121, 627-635.

(14) Bagabas, A. A. et al. *Inorg. Chem.* 2013, 52, 2854-2861.

(15) Poonia, N. S.; Bajaj, A. V. *Chem. Rev.* 1979, 79, 389-445.

(16) (a) Dell'Amico, D. B. et al. *Chem. Rev.* 2003, 103, 3857-3897. (b) Demessence, A. et al. *J. Am. Chem. Soc.* 2009, 131, 8784-8786. (c) Mason, J. A. et al. *Energy Environ. Sci.* 2011, 4, 3030-3040. (d) Patel, H. A.; Byun, J.; Yavuz, C. T. *Chem Sus Chem* 2017, 10, 1303.

(17) West, K. N. et al. *J. Phys. Chem. A* 2001, 105, 3947-3948.

(18) Han, S. S.; Goddard, W. A. III. *J. Am. Chem. Soc.* 2007, 129, 8422-8423.

(19) (a) Dudev, T.; Lim, C. *J. Am. Chem. Soc.* 2011, 133, 9506-9515. (b) Singh, N et al. *Nat. Commun.* 2013, 4, 1332. (c) Smith, A. J. et al. *Mol. Pharmaceutics* 2013, 10, 4728-4738.

EXAMPLES

Materials

Potassium hydroxide (KOH), lithium hydroxide monohydrate (LiOH·H$_2$O), γ-cyclodextrin (γ-CD) and methanol (MeOH) were purchased from Sigma Aldrich. All chemicals were used as received without further purification. CD-MOF-1 was prepared according to the literature procedures (Forgan, R. S. et al. *J. Am. Chem. Soc.* 2012, 134, 406-417; Smaldone, R. A. et al. *Angew. Chem. Int. Ed.* 2010, 49, 8630-8634).

Synthesis of CD-MOF-1 and Li/K-CD-MOF

CD-MOF-1: The synthetic protocol for CD-MOF-1 was adopted from the reported procedure. γ-CD (260 mg, 0.2 mmol) and KOH (89.7 mg, 1.6 mmol) were dissolved in H$_2$O (4 mL). The solution was filtered through a 0.45-μm syringe filter and decanted into separate vials. MeOH (5 mL) was allowed to diffuse slowly into the solution over a period of a week. Colorless cubic crystals (216 mg, 61%), suitable for X-ray crystallographic analysis, were isolated, filtered and washed with MeOH (3×5 mL), before being left to dry at 60° C. in vacuum oven.

Li/K-CD-MOF: γ-CD (260 mg, 0.2 mmol), KOH (11 mg, 0.2 mmol), LiOH·H$_2$O (60 mg, 1.4 mmol) were dissolved in H$_2$O (4 mL). The solution was filtered through a 0.45-μm syringe filter and decanted into separate vials. MeOH (5 mL) was allowed to diffuse slowly into the solution over a period of 15 days. Colorless cubic crystals (167 mg, 50%), suitable for X-ray crystallographic analysis, were isolated, filtered and washed with MeOH (3×5 mL), before being left to dry at 60° C. in vacuum oven. The samples with varying Li$^+$:K$^+$ ratio were also synthesized according to the same synthesis protocol (Table 1).

Instrumentation

Powder X-ray diffraction patterns of CD-MOF-1 and Li/K-CD-MOF were collected on a Bruker AXS APEX2 diffractometer, equipped with a CCD detector and a CuKα IμS microfocus source with MX optics. Data were collected with an area detector as rotation frames over 180° in φ at 2θ values of 12 and 240 and exposed for 10 min for each frame. At a distance of 150 mm, the detector area covers 24° in 2θ. Overlapping sections of data were matched and the resulting pattern integrated using the Bruker APEX2 Phase ID program. Powder pattern data were treated for amorphous background scatter.

The proportion of Li$^+$ and K$^+$ ions were measured by Inductively Coupled Plasma Optical Emission Spectroscopy (ICP-OES) performed on a computer-controlled (QTEGRA software v. 2.2) Thermo iCap 7600 Duo ICP-OES (Thermo Fisher Scientific, Waltham, MA, USA) operating in standard mode and equipped with a SPRINT valve and CETAC 520 autosampler (Teladyne CETAC, Omaha, NE, USA). The samples for ICP-OES were prepared by digesting crystals in aqueous nitric acid. Thermogravimetric analyses (TGA) were carried out at 10° C./min up to 800° C. under nitrogen flow (50 mL/min) using a SDTA851 (Mettler Toledo Instruments).

A suitable crystal of Li/K-CD-MOF mounted in inert oil and transferred to the cold gas stream of a Bruker APEX-II CCD diffractometer. The crystal was kept at 100.0 K during data collection. Using Olex2 (Dolomanov, O. V. et al. *J. Appl. Cryst.* 2009, 42, 339-341), the structure was solved with the ShelXS (Sheldrick, G. M. *Acta Cryst. A* 2008, 64, 112-122) structure solution program using Direct Methods and refined with the XL refinement package using Least Squares minimization. The solvent masking procedure as implemented in Olex2 was used to remove the electronic contribution of solvent molecules from the refinement. As the exact solvent content is not known, only the atoms used in the refinement model are reported in the formula.

TABLE 1

The Synthetic Conditions for Co-Crystalization of K$^+$ and Li$^+$ Ions with γ-CD. Slow Methanol Diffusion in Aqueous Solution of γ-CD, KOH, LiOH·H$_2$O Over 15 Days Gave Colorless Cubic Crystals, Suitable for X-Ray Crystallographic Analysis.

| Samples | γ-CD/g (mmol) | KOH/g (mmol) | LiOH·H$_2$O/g (mmol) | Water/ mL |
|---|---|---|---|---|
| CD-MOF-1[a] | 0.259 (0.2) | 0.09 (1.6) | — | 4 |
| Li$_{0.2}$/K$_{1.4}$-CD-MOF | 0.259 (0.2) | 0.08 (1.4) | 0.008 (0.2) | 4 |
| Li$_{0.4}$/K$_{1.2}$-CD-MOF | 0.259 (0.2) | 0.07 (1.2) | 0.017 (0.4) | 4 |
| Li$_{0.6}$/K$_{1.0}$-CD-MOF | 0.259 (0.2) | 0.056 (1) | 0.025 (0.6) | 4 |
| Li$_{0.8}$/K$_{0.8}$-CD-MOF | 0.259 (0.2) | 0.045 (0.8) | 0.034 (0.8) | 4 |
| Li$_{1.0}$/K$_{0.6}$-CD-MOF | 0.259 (0.2) | 0.034 (0.6) | 0.042 (1) | 4 |
| Li$_{1.2}$/K$_{0.4}$-CD-MOF | 0.259 (0.2) | 0.022 (0.4) | 0.05 (1.2) | 4 |
| Li$_{1.4}$/K$_{0.2}$-CD-MOF | 0.259 (0.2) | 0.011 (0.2) | 0.06 (1.4) | 4 |

TABLE 2

The Amounts of Structural Li$^+$ Ions in Li/K-CD-MOFs Measured by Inductively Coupled Plasma Optical Emission Spectroscopy (ICP-OES).

| Samples[a] | K$^+$/wt. % | K$^+$ mol % | Li$^+$/wt. % | Li$^+$/mol % |
|---|---|---|---|---|
| CD-MOF-1 | 4.86 | 100 | — | — |
| Li$_{0.2}$/K$_{1.4}$-CD-MOF | 4.68 | 95.5 | 0.04 | 4.5 |
| Li$_{0.4}$/K$_{1.2}$-CD-MOF | 4.76 | 90.6 | 0.09 | 9.4 |
| Li$_{0.6}$/K$_{1.0}$-CD-MOF | 4.77 | 86.3 | 0.13 | 13.7 |
| Li$_{0.8}$/K$_{0.8}$-CD-MOF | 4.28 | 83.6 | 0.15 | 16.4 |
| Li$_{1.0}$/K$_{0.6}$-CD-MOF | 4.27 | 79.2 | 0.2 | 20.8 |
| Li$_{1.2}$/K$_{0.4}$-CD-MOF | 3.84 | 74.0 | 0.24 | 26.0 |
| Li$_{1.4}$/K$_{0.2}$-CD-MOF | 3.41 | 66.0 | 0.31 | 34.1 |

[a]The Li/K-CD-MOFs Crystals were washed with MeOH for 5-6 times to remove uncoordinated Li$^+$ ions from the crystals before ICP-OES analysis. Li/K-CD-MOFs were digested in 5% aqueous HNO$_3$ solution at room temperature over 3 hours.

TABLE 3

Crystallographic Data For CD-MOF-1 and Li/K-CD-MOF.

| Materials | CD-MOF-1 | Li/K-CD-MOF |
|---|---|---|
| Molecular Formula | K$_2$(C$_{48}$H$_{80}$O$_{40}$) | K$_{1.23}$Li$_{0.77}$(C$_{48}$H$_{80}$O$_{40}$) |
| Crystal System | Cubic | Trigonal |
| Space Group | I 4 3 2 | R 3 2 |
| a/Å | 31.006(8) | 43.069(3) |
| b/Å | 31.006(8) | 43.069(3) |
| c/Å | 31.006(8) | 27.998(3) |
| α/° | 90 | 90 |
| β/° | 90 | 90 |
| γ/° | 90 | 120 |
| Volume/Å$^3$ | 29808.3 | 44976.7 |
| Z | 12 | 18 |
| R$_1$ | 23.91 | 9.98 |
| wR$_2$ | 0.5723 | 0.2791 |

The invention claimed is:

1. A metal organic framework comprising a coordinated network of repeating units extending in three dimensions, wherein the repeating unit comprises a cyclodextrin and a metal salt component comprising Li$^+$ and further comprising K$^+$.

2. The metal organic framework of claim 1, wherein the molar ratio of $Li^+$ to $K^+$ is between about 1:99 to about 35:65.

3. The metal organic framework of claim 1, wherein the cyclodextrin is a γ-cyclodextrin.

4. The metal organic framework of claim 3, wherein the molar ratio of $Li^+$ to $K^+$ is between about 1:99 to about 35:65.

5. The metal organic framework of claim/i further comprising an adsorbed gas.

6. The metal organic framework of claim 4, wherein the adsorbed gas is $CO_2$, $H_2$, or $N_2$.

7. The metal organic framework of claim 4 further comprising an adsorbed gas.

8. The metal organic framework of claim 7, wherein the adsorbed gas is $CO_2$, $H_2$, or $N_2$.

9. A method for the adsorption of a gas, the method comprising providing the metal organic framework according to claim 1 and a gas to be adsorbed under conditions sufficient for the adsorption of the gas within the metal organic framework.

10. The method of claim 9, wherein the gas to be adsorbed is $CO_2$, $H_2$, or $N_2$.

11. The method of claim 9, wherein the molar ratio of $Li^+$ to $K^+$ is between about 1:99 to about 35:65.

12. The method of claim 11, wherein the gas to be adsorbed is $CO_2$, $H_2$, or $N_2$.

13. The method of claim 9, wherein the cyclodextrin is a γ-cyclodextrin.

14. The method of claim 13, wherein the molar ratio of $Li^+$ to $K^+$ is between about 1:99 to about 35:65.

15. The method of claim 14, wherein the gas to be adsorbed is $CO_2$, $H_2$, or $N_2$.

16. A method for preparing a metal organic framework, the method comprising:
  (a) providing a solution comprising a cyclodextrin, a metal salt component, and a first solvent and
  (b) adding a second solvent to the solution to prepare the metal organic framework,
  wherein the metal salt component comprises $Li^+$ and $K^+$ and
  wherein the cyclodextrin, $Li^+$, or $K^+$ have a lower solubility in the second solvent than the first solvent.

* * * * *